(12) United States Patent
White

(10) Patent No.: US 8,441,721 B2
(45) Date of Patent: May 14, 2013

(54) SYSTEM AND METHOD OF RAMAN AMPLIFIER PUMP CONTROL

(75) Inventor: Christopher Alan White, Neshanic Station, NJ (US)

(73) Assignee: Alcatel Lucent, Paris (FR)

( * ) Notice: Subject to any disclaimer, the term of this patent is extended or adjusted under 35 U.S.C. 154(b) by 648 days.

(21) Appl. No.: 12/649,460

(22) Filed: Dec. 30, 2009

(65) Prior Publication Data
US 2011/0157687 A1    Jun. 30, 2011

(51) Int. Cl.
*H01S 3/00*    (2006.01)

(52) U.S. Cl.
USPC .......................................... 359/334; 359/337

(58) Field of Classification Search .................. 359/334, 359/337, 337.1
See application file for complete search history.

(56) References Cited

U.S. PATENT DOCUMENTS

| | | | |
|---|---|---|---|
| 6,590,700 B1 * | 7/2003 | Seydnejad et al. | 359/341.4 |
| 2003/0151799 A1 * | 8/2003 | Wight et al. | 359/334 |
| 2004/0036954 A1 | 2/2004 | Freund | |
| 2005/0219681 A1 * | 10/2005 | Hayashi | 359/334 |
| 2007/0258132 A1 * | 11/2007 | Zhou et al. | 359/334 |

OTHER PUBLICATIONS

R. W. Freund. Optimal Pump Control of Broadband Raman Amplifiers via Linear Programming, Bell Labs Technical Memorandum No. ITD-03-44004F, 2003.

\* cited by examiner

*Primary Examiner* — Mark Hellner
(74) *Attorney, Agent, or Firm* — David M. LaBruno

(57) ABSTRACT

An example method includes receiving power measurements for a plurality of optical channels. Deviation measurements representing a difference between respective power measurements and corresponding power targets for the plurality of optical channels are created. Correctable deviations for the plurality of optical channels are determined based on the deviation measurements. The correctable deviations may be determined by projecting the measured deviations into a space that defines Raman gain profiles achievable with a set of channels and pumps. Pump settings for a plurality of pumps are determining based upon the correctable deviations for each channel by solving an optimization problem. The pump setting so determined may be applied to the plurality of pumps.

24 Claims, 4 Drawing Sheets

SYSTEM AND METHOD OF RAMAN AMPLIFIER PUMP CONTROL

FIELD OF THE INVENTION

The invention relates to Raman amplification, and more specifically to the control of Raman amplification via the adjustment of the power levels of Raman pump lasers which may be used to compensate for fiber loss in broadband optical transmission systems.

BACKGROUND

The demand for higher capacity optical communication systems pushed common design approaches of Wavelength-Division-Multiplexed (WDM) optical systems to their limits. A typical configuration of a point-to-point WDM system includes a number of optical transmitters, optical multiplexers, spans of transmission fiber, optical amplifiers (traditionally, erbium-doped fiber amplifiers (EDFAs)), dispersion compensating devices, optical demultiplexers, and a number of optical receivers. Unfortunately, the usable gain bandwidth for the traditional EDFA optical amplifiers is limited and narrow which limits the number of independent channels supportable in a system. In addition, signal distortion and noise growth do not allow for transmission over very long optical transmission links. These limitations led to alternate methods for amplification with lower noise and greater broadband capabilities that will allow more channels and for longer spacing in between amplification and thus longer transmission distances. Optical systems with such broadband capabilities are commonly referred to as ultra long haul, Dense Wavelength-Division-Multiplexed (DWDM) systems.

Raman amplification provides a solution for broadband amplification in modern ultra long haul DWDM optical systems. Stimulated Raman scattering, which is a well-known physical phenomenon, can be employed to build amplifiers to compensate for fiber loss in optical transmission systems. In particular, Raman amplification advantageously uses the fiber itself as the amplification medium. Specifically, the output from high-power (Raman) optical pumps lasers are launched into an optical fiber at a wavelength shorter (i.e., higher energy) than that of the signal(s) to be amplified. Amplification then occurs when the pump photons are converted by the stimulated Raman effect into new photons at the signal wavelength(s).

Use of the Raman effect to transfer energy from a set of pump lasers to a set of channels is a key element in current and next generation long haul optical systems. Because the process of Raman amplification is inherently non-linear, control of a Raman amplifier should take into account not only the target channel power, but also the distribution of input channel and pump powers. For example, the addition of a single channel can significantly affect the gain profile applied to the original channel set. Further, component aging and environmental effects can cause optical channel powers to deviate from their optimal channel power targets. For these reasons, a Raman amplifier is dynamically controlled.

The typical control of Raman amplifiers requires the adjustment of the power levels of Raman pump lasers to attain a target output spectrum (i.e., target gain profile). The power of the pump lasers is adjusted dynamically so that signal powers are as flat as possible relative to some given power target. The complicated, non-linear nature of the Raman process requires a measurement and feedback based control scheme. Existing control methodologies utilized in Raman amplifiers typically consist of an iterative process which initiates pump changes based upon an approximate Raman gain model. For each iteration of the control process, output channel powers are compared to a predefined target; when the channel powers match the target, the process terminates. The definition of an error function which quantifies this comparison provides the goal of the control methodology. Aside from reducing the deviation from target, the pump changes also need to satisfy several constraints on channel and pump powers (e.g., maximum power available from the pump, maximum power per channel, etc.).

For example, a linear programming method of determining optimal pump configurations may be utilized for broadband Raman amplifier control. In one embodiment employing this type of Raman amplifier control, disclosed by the teachings of U.S. Patent Application Publication 2004/0036954, published Feb. 26, 2004, and incorporated herein by reference in its entirety, a linear program based on a linearized model of Raman gain is created. The linear program can be solved using a standard linear program solver and the solution provides Raman pump settings to obtain an optimal gain profile.

SUMMARY

The constraints on channel and pump powers and the non-linear coupling involved in the control of Raman amplification make such control a difficult problem. Conventional methodologies of Raman amplifier controls can be slow to converge, may achieve non-optimal solutions at convergence and are sensitive to small (and large) measurement errors or noise. Unfortunately as the number of channels grows or the complexity of the targeted gain profile increases, all of these problems increase.

Many of the problems of conventional methods of Raman amplifier control are related to the definition of an error function which quantifies the comparison between measured and targeted optical channel powers. Since the error function provides the goal of the control methodology, the nature of the error function can have a significant effect on control stability and convergence. More critical for Raman control is the fact that adjustments to the Raman pump lasers cannot produce an arbitrary gain profile for the channels.

One critical failing of existing control methodologies is their use of an error function which relies on channel by channel power comparisons with a set of target powers. In particular, a channel power distribution which cannot be corrected by adjusting the Raman pump powers can cause significant convergence difficulties, or worse, cause the system to converge to an incorrect pump setting.

For example, if an in-field optical channel power measurement device fails such that an improper channel measurement occurs, conventional control schemes will encounter significant difficulties handling this error, resulting in sub-optimal performance. For instance, a single channel power measurement error may cause conventional linear programming methodologies of Raman amplifier control to fail to converge to a suitable solution.

System, method and apparatus embodiments are provided for the control of Raman amplification. Such embodiments involve the determination and setting of the power levels of Raman pump lasers to attain a target output spectrum. The embodiments provided here enhance the stability and convergence of Raman amplifier control methodologies as compared to conventional embodiments. The provided apparatuses and methods achieve this stability by projecting the current deviation from the target output onto the subspace of correctable changes so as to achieve a target output spectrum in a faster, more stable manner. For instance, in the face a channel power measurement error, implementations of Raman amplifiers including the projection methodology provided herein converge to a suitable solution for Raman pump settings.

In one embodiment, a projection based error method for the optimization of optical channel power levels is provided in a Raman amplified transmission system. The projection based methodology removes a feature which cannot be corrected by the adjustment of Raman pump lasers from a set of measured deviations from targeted optical channel powers. The removal of the non-correctable feature allows the optimization method to focus on the space of correctable changes. The Raman control methodology thus provided has the benefit of being faster, more stable and more robust to both hardware and software measurement failures.

In one embodiment, a measured error vector is projected into the space of correctable deviations. The projection is enabled by expressing the basic Raman physics as a matrix vector multiplication through a manipulation and integration of the basic Raman equations. Within this formulation, the matrix defines the space of possible Raman gain profiles achievable given a set of channels and pump lasers. By projecting the measured error vector into this space, the matrix can be partitioned into the deviations which are correctable and the deviations which are not correctable. The optimization method gains significant benefits from the projection based error function's removal of the non-correctable deviations.

In one embodiment, a method comprises receiving measured channel powers, determining deviations of respective measured channel powers from respective target channel powers, projecting the deviations into a space that defines Raman gain profiles achievable with a set of channels and pump lasers whereby projected deviations are formed, and determining power setting values for the pump lasers based on the projected deviations.

The method may further include applying the power setting values determined to the pump lasers. The method may also be repeated until the projected deviations satisfy a convergence criteria.

In one embodiment, the method includes compensating the deviations for fiber propagation loss. In another embodiment, the methods include determining deviations that are not correctable based on the projected deviations, and passing the deviations that are not correctable to a wavelength selectable switch for diagnostic purposes. Measuring channel power for a plurality of channels may be included in an embodiment.

Determining power setting values may include solving an optimization problem using the projected deviations. And, the optimization problem may be a first-order optimization problem, a linear programming optimization problem, a steepest descent optimization problem, a genetic optimization problem, a simulated annealing optimization problem and the like.

In one example, a method includes removing a feature which cannot be corrected by the adjustment of a plurality of Raman pumps from a set of measured deviations from targeted optical channel powers, and optimizing power setting values for the plurality of Raman pumps based on a space of correctable changes, the space of correctable changes comprising the set of measured deviations from targeted optical channel powers after the feature is removed.

Optimizing power settings may include solving an optimization problem with use of the space of correctable changes to thereby determine the power setting values for the plurality of Raman pumps for subsequent use in setting one or more Raman pump powers.

In one embodiment, the optimization problem is directed to determining one or more of the power setting values for the plurality of Raman pumps which substantially minimize the measured deviations from targeted optical channel powers after the feature is removed.

In another example embodiment, a method includes receiving power measurements for a plurality of optical channels, creating deviation measurements representing a difference between respective power measurements and corresponding power targets for the plurality of optical channels, determining correctable deviations for the plurality of optical channels based on the deviation measurements, and determining a pump setting for a plurality of pumps based upon the correctable deviations for each channel.

In one embodiment, the correctable deviations for respective optical channels depend on Raman pump gain profiles of a set of the plurality of pumps that address the respective optical channel and corresponding deviation measurements that are directed to the respective optical channel.

In another embodiment, determining correctable deviations includes determining a correctable deviation $Y_i$, wherein $Y_i = \text{Sum}(j) P_{ij} E_j$ wherein $i$ and $j$ are channel numbers of one of the plurality of channels, $P_{ij}$ is a projector which represents the space of correctable deviations and $E_j$ is the deviation measurement for channel $j$. The correctable deviation vector $Y_i$ is the deviation in channel power away from a target power which can be corrected by adjusting the Raman Pumps and will be used for the control. Accordingly, determining a pump setting for a plurality of pumps may include solving an optimization problem using the correctable deviations for each channel. Pump settings for the plurality of pumps may also be applied to pumps in one embodiment.

In one embodiment, the method is repeated until the correctable deviation satisfies a convergence criteria. In another embodiment, approximate fiber propagation loss is removed from the deviation measurements.

One embodiment may include determining the power measurements for the plurality of optical channels. Another embodiment may include determining non-correctable deviations for the plurality of optical channels based on the correctable deviations, and forwarding the non-correctable deviations for subsequent use setting one or more optical channel powers.

One example method includes receiving a Raman gain coupling matrix based upon at least one of fiber type, fiber loss, channels and pumps present in a Raman amplifier. Another example method includes constructing a projector ($P_{ij}$) which projects into the column space of the Raman gain coupling matrix R. For example, the projector may be obtained through a Gram-Schmidt orthogonalization procedure of the columns of R.

Reference herein to "one embodiment" "another embodiment" or "an embodiment" means that a particular feature, structure, or characteristic described in connection with the embodiment can be included in at least one embodiment of the invention. The appearances of these phrases (e.g., "in one embodiment") in various places in the specification are not necessarily all referring to the same embodiment, nor are separate or alternative embodiments necessarily mutually exclusive of other embodiments. The same applies to the term "implementation."

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein:

FIG. 4 is a flowchart detailing the operation of an example method for controlling the pump powers of a Raman-pumped optical system in accordance with the principles described herein; and.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used here in the description, the term "and" is used in both the conjunctive and disjunctive sense and includes any and all combinations of one or more of an associated list of items.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
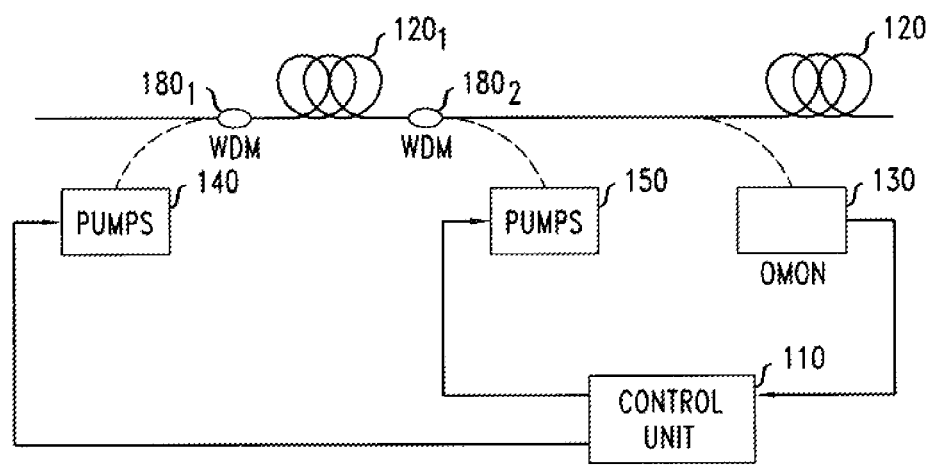
FIG. 1 is a high-level block diagram of a Raman-pumped DWDM system employing Raman amplification according to the principles of the described embodiments.

FIG. 1 is a high-level block diagram of a Raman-pumped Dense Wavelength-Division-Multiplexed (DWDM) system 100 employing Raman amplification according to the principles described herein. Signals are carried on spans of optical fiber $120_1$, $120_2$. Optical fiber $120_1$, $120_2$ may be True Wave Reduced Slope fiber (TWRS), Dispersion-Compensating fiber (DCF) and the like, which are conventional and fully familiar to those of ordinary skill in the art. Power profiles of amplified optical signals are measured by Optical Channel Monitor (OMON) 130 and may be used to calculate parameters employed to achieve broadband Raman gain flattening.

Briefly stated, optical signals enter DWDM system 100. The signals are then amplified in the first fiber span $120_1$ and the power profile is subsequently measured by OMON 130. The optical signals then proceed to a second fiber span $120_2$ and proceed through the DWDM system 100. Example system 100 of FIG. 1 includes control unit 110, a set of forward Raman pumps 140 (e.g., three), a first set of backward Raman pumps 150 (e.g., six), and two Wavelength-Division-Multiplexers (WDMs) $180_1$, $180_2$ for coupling the Raman pump waves into system 100.

As can be seen from FIG. 1, all entering optical signals pass through fiber span $120_1$, where they may be amplified by the three forward Raman pumps 140 and the six backward Raman pumps 150. The Raman pump waves of the Raman pump sets 140 and 150 are coupled into the fiber span by WDMs $180_1$ and $180_2$. The first set of backward Raman pumps 140 may be optionally implemented to advantageously reduce WDM loss in the span due to noise nonlinearity caused by power fluctuations in the pumps. After the optical signal is amplified, a first gain profile is determined by the OMON 130. The optical signals then proceed to a second fiber span $120_2$, for example a 5-km DCF. Though not illustrated, in the second fiber span, the optical signals may again be amplified, for example by Raman amplification as described herein. For instance, the second fiber span $120_2$ may include a second Raman amplifier.

In accordance with an illustrative embodiment, the channel power measurements determined by the OMON 130 are transmitted to control unit 110. These determinations may, for example, include data reflecting signal powers, pump wavelengths, and other system parameters. The control unit 110 may advantageously process the information from the OMON 130 and calculate the appropriate Raman pump powers for gain flattening across the system in accordance with the principles described herein, and illustratively, in accordance with the method described in detail below.

Briefly, control unit 110 utilizes power spectrum data provided by the OMON 170 to responsively adjust the pump powers of the Raman pumps (illustratively, Raman pumps 140, 150) in a manner tending to produce a relatively flat gain profile (or other desired gain profile). The control function of the exemplary embodiment may also include a negative feedback loop that automatically adjusts Raman pump powers based on signal power profile. In one embodiment, the output signal profile is advantageously used as the input to the next fiber span $120_2$ and gain flattening is then performed according to the output signal profile from the first fiber span $120_1$.

Figure 2:
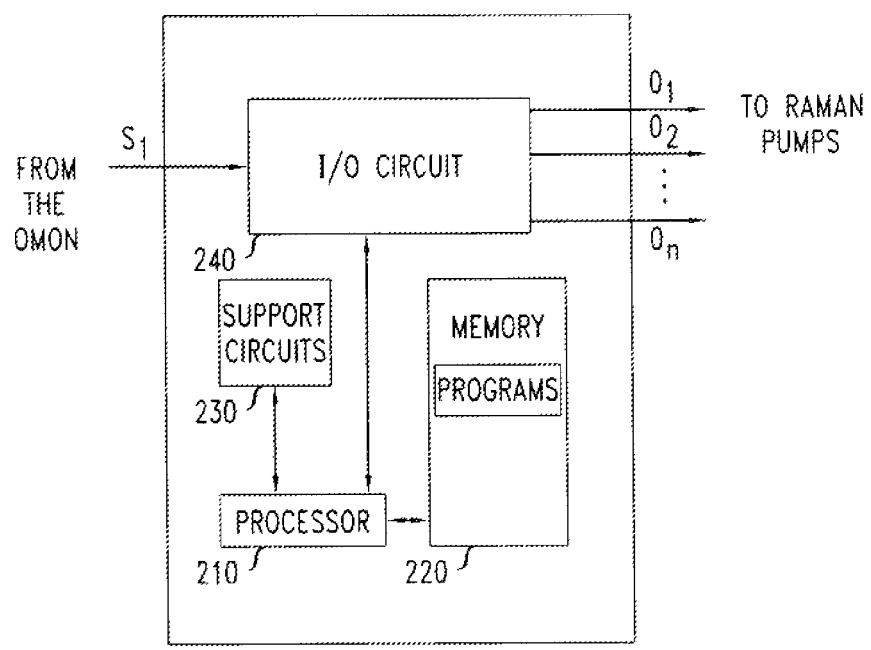
FIG. 2 shows a high-level block diagram of an example control unit suitable for use in a system for controlling the pump powers of a Raman-pumped optical system in accordance with the description herein.

FIG. 2 shows a high-level block diagram of a control unit suitable for use in a system for controlling the pump powers of a Raman-pumped optical system in accordance with an example embodiment. More specifically, the illustrated control unit comprises an illustrative embodiment of a control unit suitable for use in the Raman-pumped DWDM system 100 of FIG. 1. The control unit 110 of FIG. 2 illustratively comprises processor 210, as well as memory 220 for storing software and/or firmware implementations of the methodology described herein and other control programs. Processor 210 advantageously cooperates with conventional support circuitry 230 such as power supplies, clock circuits, cache memory and the like, as well as circuits that assist in executing the software/firmware routines stored in memory 220. Control unit 110 also advantageously contains input-output circuitry 240 that forms an interface between the various functional elements communicating with the control unit 110. For example, as shown in FIG. 2, control unit 110 advantageously communicates with the OMON 110 devices via a signal path S1 and to each of a plurality of Raman pumps via signal paths $O_1$-$O_n$.

A Raman amplifier can be described according to the equations for a Raman amplification model which describes the physics of Raman amplification occurring within the Raman amplifier. For example, a distributed Raman amplifier may be described by a simplified Raman model that includes only the fiber loss and the Raman amplification terms. While it is possible to add several other optical power effects to the model such as Rayleigh back scattering, four wave mixing, etc, typical optical networks are designed to operate within a control regime where these effects are not important. For instance, while a first order optimization method is described herein, one skilled in the art may extend the Raman model and thus the optimization problem to next level utilizing know techniques.

It is noted that for Raman amplification both the Raman gain matrix (R) and the loss coefficient (A) are independent of distance (z); this indicates a single type of optical fiber is used to perform the amplification, which is a good approximation for a typical optical Raman amplifier. This simplified Raman model may be denoted $$\frac{d\rho^{\pm}(z, v)}{dz} = A(v)\rho^{\pm}(z, v) + \int_{-\infty}^{\infty} d\mu R(v, \mu)\rho^{\pm}(z, v)[\rho^{+}(z, \mu) + \rho^{-}(z, \mu)] \quad (1)$$

where $\rho$ is optical power density; $v$ is frequency of the amplified signal; and $\mu$ is frequency of the optical power density providing the Raman gain By dividing through by $\rho(z,v)$, one obtains $$\frac{d\ln\rho^{\pm}(z, v)}{dz} = A(v) + \int_{-\infty}^{\infty} d\mu R(v, \mu)[\rho^{+}(z, \mu) + \rho^{-}(z, \mu)] \quad (2)$$

Integrating through by z, one obtains $$\ln\rho^{\pm}(L, v) - \ln\rho^{\pm}(0, v) = \quad (3)$$

$$A(v) + \int_{-\infty}^{\infty} d\mu R(v, \mu) \int_{0}^{L} dz[\rho^{+}(z, \mu) + \rho^{-}(z, \mu)]$$

where L is the optical propagation length in the fiber span.

Moving to dealing directly with the logarithmic quantities $$\gamma^{\pm}(L, v) = [\gamma^{\pm}(0, v) + A(v)] + \int_{-\infty}^{\infty} d\mu R(v, \mu) \int_{0}^{L} dz[e^{\gamma^{+}(z,\mu)} + e^{\gamma^{-}(z,\mu)}] \quad (4)$$

where $\gamma$ is the natural log of the optical power density.

Moving to a discretized version of these equations, one obtains $$y_i = \alpha_i + \sum_j R_{i,j}\beta_j \quad (5)$$

Here $y_i$ is a column vector containing output power measurements of all relevant frequencies of interest in both the forward and backward power densities, $\alpha$ is approximate fiber propagation loss and R is the Raman gain matrix. All information concerning the input optical signal and pump powers are contained within the $\beta_j$ (Beta j) term.

If i,j are allowed to run over all pumps and signals both backward and forward propagating in the system $$\beta_j \int_{0}^{L} dz[e^{\gamma^{+}(z,v)} + e^{\gamma^{-}(z,v)}] \quad (6)$$

It is noted that $\beta_j$ depends strongly on the input optical powers for both the channels and the optical pumps. The $\beta_j$ are difficult to compute since they require knowledge of the power density throughout the fiber.

Typically, computational methods which solve for Raman gain proceed iteratively, refining the $\beta_j$ values on each iteration of the solver. For our purposes, it is sufficient to note that the $\beta_j$ values exist and contain all of the information regarding the input power densities. Thus, if it can be stated that no $\beta_j$ exists which is consistent with a required Raman gain, it is clear that no set of channel and pump powers can correct this measured deviation. Thus, a measured deviation can be partitioned into a correctable portion for which a consistent $\beta_j$ exists and a non-correctable portion for which no suitable $\beta_j$ exists.

Typically, Raman control algorithms attempt to minimize the ripple of the span which consists of minimizing the largest peak to peak difference from a target while keeping dist_to_target constrained within a limited range. This ensures the smallest possible deviation from the target as well as attempts to center the spectrum along the target.

$$\text{ripple}(y - y^{target}) \equiv \max_{i=1,2,\ldots,n}(y_i - y_i^{target}) - \quad (7)$$

$$\min_{i=1,2,\ldots,n}(y_i - y_i^{target}) \backslash \text{dist\_to\_target}(y - y^{target}) \equiv$$

$$\frac{1}{2}\left(\max_{i=1,2,\ldots,n}(y_i - y_i^{target}) + \min_{i=1,2,\ldots,n}(y_i - y_i^{target})\right)$$

However, this type of objective function (7) has several significant shortcomings including that it only depends on two points of the distribution of signals. Therefore, any hardware or other error that produces a single channel measurement which is incorrect may cause the error function to reflect the properties of that single point. Error functions which attempt to look at the error for all channels often ensure most channels are close to the target but at the expense of a few channels which may be far from the target. For a commercial communications system, where it may be preferable to ensure that all channels are within an acceptable range, these type of methods fail to produce the optimal solution.

The interplay between single point errors and collective errors can lead to a variety of methods which use heuristics to reach an optimal solution. Instead of appealing to such a heuristics based method, the methodology described herein uses the information contained within the Raman gain matrix directly to determine which errors are correctable via adjustment of the Raman pumps Because the number of pumps in a Raman amplifier is usually much smaller than the number of signals to be amplified, there is not enough flexibility to achieve every possible (i.e., any) signal change. In fact, the changes possible by changing pump power settings create a subspace of possible changes. Looking at the projection of a goal signal change onto this space, one can obtain the signal changes which are achievable by changing the pumps within the approximation give by Equation (5) above. Such a methodology is robust to single or few channel power measurement problems.

In one embodiment, the methodology described may be implemented by performing a Gram-Schmidt orthogonalization on the columns of the Raman gain matrix R. This will produce n orthogonal vectors (one for each pump) each of length m (one element for each signal). During this process, pairs of vectors may be tested to determine if two vectors approach unit overlap. Such linear dependence results because two pumps may have an identical effect on a limited number of signals. For cases of near linear dependency, it is possible for the optimization algorithm to attempt to achieve a non-physical situation where it uses these small differences to correct the current error. However, such a case often leads to unrealistically large pump powers. To remove this problem, near linearly dependent vectors are removed from the definition of the subspace. The optimization algorithm will still attempt to adjust both pumps, but only one vector need be included in the definition of the correctable space.

Removal of near linearly dependent vectors does introduce a small asymmetry in the optimization algorithm since the vector that gets selected depends on the order in which the vectors are created. But, if the two vectors are nearly linearly dependent, this asymmetry should be small. This asymmetry may also be able to be removed by including the average of the two vectors in the definition of the subspace.

Each new orthogonal vector $\Psi$ may be subtracted from the current error $$E_{new} = E_{old} - \sum_j (E \cdot \psi_j)\psi_j \qquad (8)$$

to produce the projection of the current error vector into the subspace of the possible adjustments using this set of pumps, where j is pump number, E is measured error. It is noted that this process will project out any sharp features in the error which are inconsistent with errors which are correctable with a smooth Raman gain curve. The projected error is then passed back to an optimization algorithm which applies the error criteria to the projected error. Since the features which within this approximation cannot be corrected have been removed, the optimization algorithm will no longer attempt to change the pumps to fix these features. It is noted the outer product of these vectors $\Psi$ is exactly the projector Pij described above.

Figure 3:
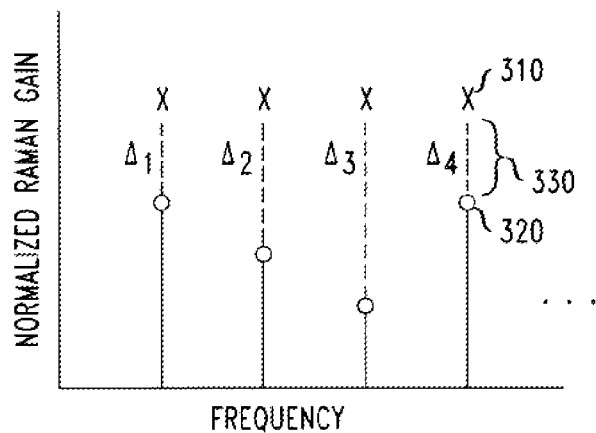
FIG. 3 is a graphical illustration of target and measured power for a plurality of channels in an example embodiment according to the principles of the described embodiments.

FIG. 3 is a graphical illustration of target and measured power for a plurality of channels in an example embodiment according to the principles of the described embodiments. For each channel of a plurality of channel noted in the frequency domain, the illustrated Raman gain profile has a target power 310 (indicated by an 'X'). For each channel of the plurality of channels, a measured power 320 (indicated by an 'O') is determined, for example through use of the OMON as illustrated in FIG. 1. There is a deviation 330 ($\Delta_1$, $\Delta_2$, $\Delta_3$, $\Delta_4$, etc.) between the measured power and the target power for each channel (four channels being shown for ease of illustration). The objective of the Raman control methodology provided herein is to minimize the sum of the deviations.

Figure 4:
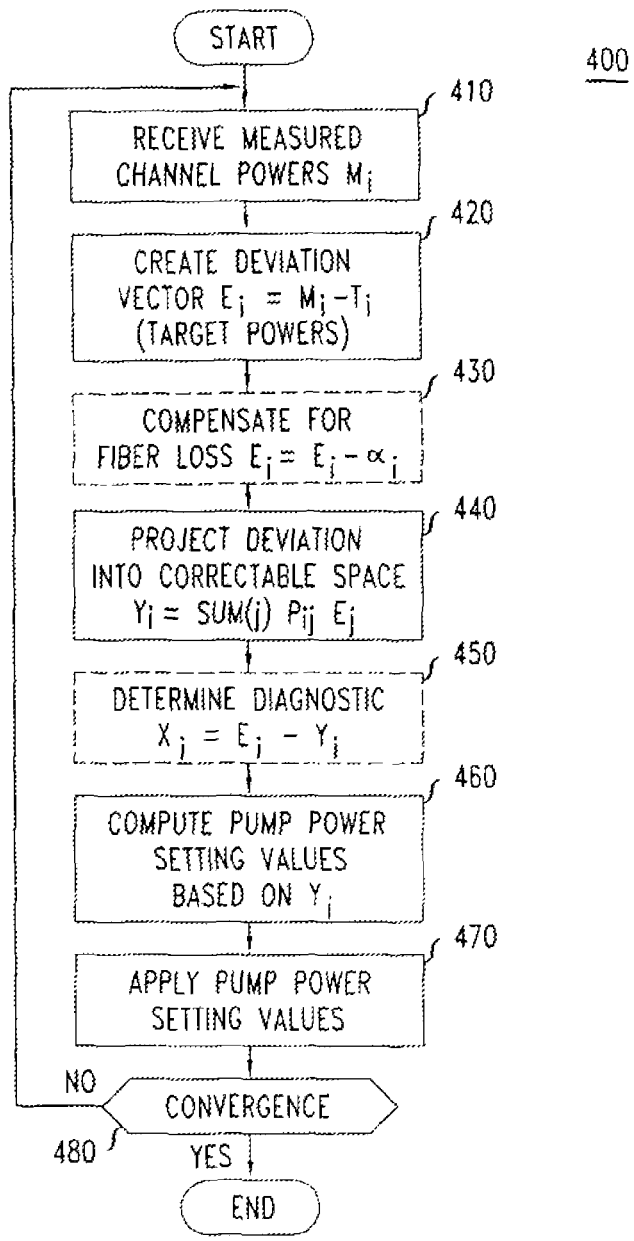

FIG. 4 is a flowchart detailing the operation of an example method for controlling the pump powers of a Raman-pumped optical system in accordance with the principles of the invention. The steps of method 400 will be described with reference to control unit 110 in FIG. 2 and graphical illustration of FIG. 3. The steps of the flow charts described herein are not all inclusive and example methods may include other steps not shown. The steps may also be performed in an alternative order.

For example, prior to the method steps shown, a Raman gain coupling matrix (R) is created based upon fiber types, fiber loss, channels and pumps present in the Raman amplifier. Also a projector (Pij, where i,j are channel numbers) which projects into the column space of the Raman gain coupling matrix may be constructed. For example, the projector can be obtained through a Gram-Schmidt orthogonalization procedure on the columns of R to produce the $\Psi$ vectors described in Equation (8) above.

At step 410, the control unit 110, receives power measurements (Mi) for a plurality of optical channels. The power measurement may be made by an OMON and provided to the control unit. At step 420, deviation measurements (Ei) representing a difference between respective power measurements and corresponding power targets (Ti) for the plurality of optical channels are created (Ei=Mi−Ti). The deviation vector $E_i$ may be calculated by subtracting measured channel powers from target channel powers.

At optional step 430, the deviation measurements may be compensated for the approximate fiber propagation loss (Ei=Ei—αi, where αi is fiber propagation loss for signal i). Such a step serves to remove approximate fiber propagation loss from the deviation vector.

At step 440, correctable deviations (Yi) for the plurality of optical channels are determined. Yi is the deviation which can be corrected by adjusting the Raman Pumps and is used for the control of the pumps. The correctable deviations for respective optical channels depends on Raman pump gain profiles of a set of the plurality of pumps that address the respective optical channel and corresponding deviation measurements that are directed to the respective optical channel (Yi=Sum(j) Pij Ej). Thus, determining correctable deviations may include determining a correctable deviation vector Yi, wherein Yi=Sum(j) Pij Ej wherein i,j are channel numbers of one of the plurality of channels, Pij is a projector into the subspace represented by the columns of the Raman gain matrix, and Ej is the deviation measurement for channel j.

At optional step 450, a deviation which can not be corrected (Xi) is determined based on the deviation which is correctable. For example, the deviation which can not be corrected may be calculated as the difference between the measured deviation vector and the deviation which can be corrected (Xi=Ei−Yi). The deviation which can not be corrected may be used as a diagnostic signal. For instance, the deviation which can not be corrected may be passed to a wavelength selectable switch, which may have more flexibility in changing power, for further diagnostic purposes.

At step 460, a pump setting for a plurality of pumps is determining based upon the correctable deviations for each channel (Yi). Determining a pump setting for the plurality of pumps may include solving an optimization problem using the correctable deviations for each channel. The optimization problem to be solved may be a first-order optimization problem, a linear programming optimization problem, a steepest descent optimization problem, a genetic optimization problem, a simulated annealing optimization problem and the like.

In another embodiment, step 440 may be described as removing a feature which cannot be corrected by the adjustment of a plurality of Raman pumps from a set of measured deviations from targeted optical channel powers. In that embodiment, step 460 optimizes power setting values for the plurality of Raman pumps based on a space of correctable changes, which is the set of measured deviations from targeted optical channel powers after the feature is removed. The power settings for subsequent use in setting one or more Raman pump powers are determined by solving an optimization problem with use of the space of correctable changes. The optimization problem is directed to determining one or more of the power setting values for the plurality of Raman pumps which substantially minimize the measured deviations from targeted optical channel powers after the feature is removed.

At step 470, the pump settings for the plurality of pumps are applied to the pumps. The methodology described to this step may be repeated until the correctable deviations satisfy a convergence criteria. Thus, at step 480, a convergence criteria is tested. The convergence criteria may be a threshold level of correctable deviations such that ripple is sufficiently small. If the correctable deviation Yi satisfies the convergence criteria, the method terminates. If the correctable deviation Yi does not satisfies the convergence criteria, the method loops to step 410, and the methodology described above is repeated.

The methodology described herein may be implemented in the control software which runs on Raman amplifiers in an optical network. Amplifiers enabled with the described methodology may periodically attempt to adjust optical channel powers to match targeted power levels. Each amplifier can accordingly measure optical channel powers and adjust Raman pump lasers in order to provide optimal network operation.

As described herein, the provided methodology allows a Raman control algorithm to ignore channel power deviations from targets which cannot be corrected through the adjustment of Raman pump lasers. By focusing on the correctable errors, embodiments according to the invention results in a more stable, faster converging control which is also more robust to hardware measurement errors and noise. Improved amplifier control translates directly into a more optimally functioning optical network.

Figure 5:
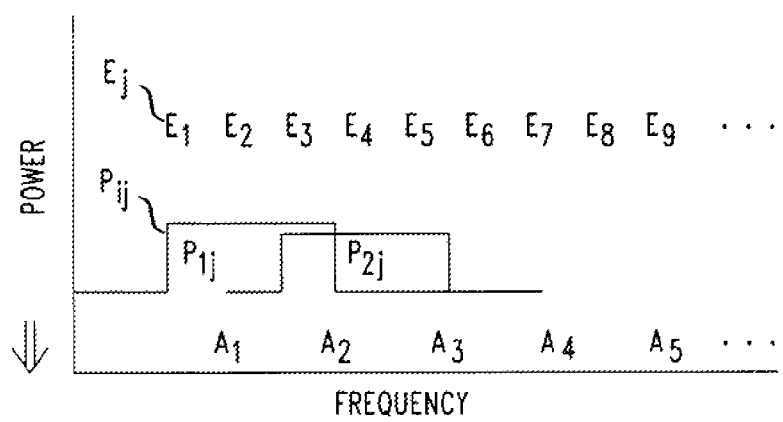
FIG. 5 is a graphical illustration of the projected space for a plurality of channels in an example embodiment according to the principles described herein.

FIG. 5 is a graphical illustration of the projected space for a plurality of channels in an example embodiment according to the principles described herein. FIG. 5 may be viewed in conjunction with the example method described with respect to FIG. 4. Ei illustrates deviations of respective measured channel powers from respective target channel powers for a plurality of channels. The Raman control methodology provided herein seeks to minimize the sum of these deviations. Note that the number of channels (i) varies from embodiment to embodiment. Thus, the number of channels is not fixed for all embodiments. For example, there may be one-hundred-twenty eight (128) channels. However, more or less channels may be utilized in any optical transmission system employing the Raman amplification according to the principles described herein. FIG. 5 illustrates nine (9) channels for ease of illustration.

A number of Raman pumps are provided to enable Raman amplification. By combining the Raman amplification effect of multiple pump waves selected carefully in the wavelength domain, a broad Raman gain bandwidth can be achieved. As illustrated, the letter 'A' denotes pump laser utilized to create the Raman gain bandwidth ($A_1$ a first pump laser, $A_2$ a second pump laser, etc.). For example and for ease of illustration, five pumps are illustrated as being utilized to create the Raman gain bandwidth. A greater or lesser number of pumps may be utilized in an embodiment.

Pij is a projector into the subspace spanned by the column vectors of the Raman gain matrix. The projector (Pij) is used to project the deviations into the column space of the Raman gain coupling matrix. The Raman gain matrix is a matrix Rij which couples pumps (indexed by j) to signals (indexed by i) so if there are n pumps and m signals, j goes from 1 to n and i goes from 1 to m. The projector Pij is a square (m×m) matrix which when multiplied with a vector of channel powers (these vectors are of length m) will produce a new vector (also of length m) of the channel powers which are correctable via pump changes.

To form the projector matrix Pij, one starts with the columns of Rij. There are n columns (one for each pump) and theses columns are all vectors of length m. An orthonormal set of vectors which span the same space as the columns of R is found. As noted above, the projector can be obtained using the Gram-Schmidt procedure on the columns of R. If there are no linear dependencies, n orthogonal vectors of length m are obtained (these are the Ψ of Equation (8)). Taking the outer product of these vectors produces the Pij matrix. When a vector (like the error vector Ei) is multiplied by Pij, one finds the portion of that vector which is representable by the set of orthogonal vectors—which is the changes that can be impacted by changing the pumps. In this manner, the contributions to a deviation vector that are correctable through adjustment of Raman pumps can be utilized as a control while disregarding non-correctable deviations.

The functions of the various elements described above with respect to the example methods may be provided through the use of dedicated hardware as well as being readily carried out by special or general purpose digital information processing devices acting under appropriate instructions embodied, e.g., in software, firmware, hardware or some combination of these. For example, an element may be implemented as dedicated hardware. Dedicated hardware elements may be referred to as "processors", "controllers", "control units" or some similar terminology. When provided by a processor, the functions may be provided by a single dedicated processor, by a single shared processor, or by a plurality of individual processors, some of which may be shared. Moreover, explicit use of the terms "processor", "controller" and "control unit" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module. For example, functional modules of the DSP and the other logic circuits can be implemented as an ASIC (Application Specific Integrated Circuit) constructed with semiconductor technology and may also be implemented with FPGA (Field Programmable Gate Arrays) or any other hardware blocks.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

What is claimed is:

1. A method comprising:
receiving measured channel powers;
determining deviations of respective measured channel powers from respective target channel powers;
projecting the deviations into a space that defines Raman gain profiles achievable with a set of channels and pump lasers whereby projected deviations are formed; and
determining power setting values for the pump lasers based on the projected deviations.

2. The method of claim 1 further comprising:
applying the power setting values determined to the pump lasers.

3. The method of claim 2 wherein the method is repeated until the projected deviations satisfy a convergence criteria.

4. The method of claim 1 further comprising:
compensating the deviations for fiber propagation loss.

5. The method of claim 1 further comprising:
determining deviations that are not correctable based on the projected deviations; and
passing the deviations that are not correctable to a wavelength selectable switch for diagnostic purposes.

6. The method of claim 1 further comprising:
measuring channel power for a plurality of channels.

7. The method of claim 1 wherein determining power setting values comprises:
solving an optimization problem using the projected deviations.

8. The method of claim 7 wherein the optimization problem is a first-order optimization problem, a linear programming optimization problem, a steepest descent optimization problem, genetic optimization problem, or simulated annealing optimization problem.

9. A method comprising:
removing a feature which cannot be corrected by the adjustment of a plurality of Raman pumps from a set of measured deviations from targeted optical channel powers; and
optimizing power setting values for the plurality of Raman pumps based on a space of correctable changes, the space of correctable changes comprising the set of measured deviations from targeted optical channel powers after the feature is removed.

10. The method of claim 9 wherein optimizing power settings comprises:
solving an optimization problem with use of the space of correctable changes to thereby determine the power setting values for the plurality of Raman pumps for subsequent use in setting one or more Raman pump powers.

11. The method of claim 10 wherein the optimization problem is a first-order optimization problem, a linear programming optimization problem, a steepest descent optimization problem, genetic optimization problem, or simulated annealing optimization problem and the like.

12. The method of claim 10 wherein the optimization problem is directed to determining one or more of the power setting values for the plurality of Raman pumps which substantially minimize the measured deviations from targeted optical channel powers after the feature is removed.

13. A method comprising:
receiving power measurements for a plurality of optical channels;
creating deviation measurements representing a difference between respective power measurements and corresponding power targets for the plurality of optical channels;
determining correctable deviations for the plurality of optical channels based on the deviation measurements, the correctable deviations being a correctable portion of a partition of the deviation measurements into the correctable portion and non-correctable portion; and
determining a pump setting for a plurality of pumps based upon the correctable deviations for each channel.

14. The method of claim 13 wherein the correctable deviations for respective optical channels depend on Raman pump gain profiles of a set of the plurality of pumps that address the respective optical channel and corresponding deviation measurements that are directed to the respective optical channel.

15. The method of claim 13 wherein determining correctable deviations comprises:
determining a correctable deviation vector Yi, wherein $Y_i = \text{Sum}(j) P_{ij} E_j$ wherein i,j are channel numbers of one of the plurality of channels, $P_{ij}$ is a projector into the space spanned by the column vectors of the Raman gain matrix, and $E_j$ is the deviation measurement for channel j.

16. The method of claim 13 wherein determining a pump setting for a plurality of pumps comprises:
solving an optimization problem using the correctable deviations for each channel.

17. The method of claim 13 further comprising:
applying the pump setting for the plurality of pumps to the pumps.

18. The method of claim 13 further comprising:
determining non-correctable deviations for the plurality of optical channels based on the correctable deviations; and
forwarding the non-correctable deviations for subsequent use setting one or more optical channel powers.

19. An apparatus comprising:
a processor configured to receive measured channel powers and to determine deviations of respective measured channel powers from respective target channel powers, wherein the processor is further configured to project the deviations into a space that defines Raman gain profiles achievable with a set of channels and pump lasers whereby projected deviations are formed, and wherein the processor is further configured to determine power setting values for the pump lasers based on the projected deviations.

20. A non-transitory computer readable medium having stored thereon instructions comprising machine executable code which when executed by at least one processor, causes the processor to receive power measurements for a plurality of optical channels;

create deviation measurements representing a difference between respective power measurements and corresponding power targets for the plurality of optical channels;

determining correctable deviations for the plurality of optical channels, the correctable deviations being a correctable portion of a partition of the deviation measurements into the correctable portion and a non-correctable portion; and determining a pump setting for a plurality of pumps based upon the correctable deviations for each channel.

21. The apparatus of claim 19 wherein the processor is configured to compensate the deviations for fiber propagation loss.

22. The apparatus of claim 19 wherein the processor is configured to determine deviations that are not correctable based on the projected deviations; and forward the deviations that are not correctable for diagnostic purposes.

23. An apparatus comprising:

a processor configured to remove a feature which cannot be corrected by the adjustment of a plurality of Raman pumps from a set of measured deviations from targeted optical channel powers; and wherein the processor is further configured to optimize power setting values for the plurality of Raman pumps based on a space of correctable changes, the space of correctable changes comprising the set of measured deviations from targeted optical channel powers after the feature is removed.

24. An apparatus comprising:

a processor and a memory unit associated with the processor, the processor configure to receive power measurements for a plurality of optical channels;

create deviation measurements representing a difference between respective power measurements and corresponding power targets for the plurality of optical channels;

determine correctable deviations for the plurality of optical channels based on the deviation measurements, the correctable deviations being a correctable portion of a partition of the deviation measurements into the correctable portion and non-correctable portion; and determine a pump setting for a plurality of pumps based upon the correctable deviations for each channel.

* * * * *